United States Patent [19]

Mochizuki et al.

[11] 4,236,187
[45] Nov. 25, 1980

[54] POWER SUPPLY VOLTAGE STABILIZER

[75] Inventors: Daisuke Mochizuki; Michiyuki Horiguchi, both of Nara, Japan

[73] Assignee: Sharp Kabushiki Kaisha, Osaka, Japan

[21] Appl. No.: 950,781

[22] Filed: Oct. 12, 1978

[30] Foreign Application Priority Data

Oct. 18, 1977 [JP] Japan .............................. 52/125509
Oct. 18, 1977 [JP] Japan .............................. 52/125510

[51] Int. Cl.³ .................... H02M 1/18; H02M 3/335
[52] U.S. Cl. .................................. 361/36; 361/91; 361/93; 363/21; 363/56
[58] Field of Search ................ 361/18, 35, 36, 91, 361/93; 363/20, 55, 21, 56, 92

[56] References Cited

U.S. PATENT DOCUMENTS

| | | | |
|---|---|---|---|
| 3,299,321 | 1/1967 | Damon | 361/35 |
| 3,386,005 | 5/1968 | Roland et al. | 363/50 X |
| 3,863,125 | 1/1975 | Tollrian et al. | 361/93 X |
| 4,005,351 | 1/1977 | Blum | 363/50 |
| 4,034,280 | 7/1977 | Cronin et al. | 363/25 |
| 4,058,758 | 11/1977 | Peterson | 363/25 X |
| 4,156,273 | 5/1979 | Sato | 363/21 |

Primary Examiner—J. D. Miller
Assistant Examiner—L. C. Schroeder
Attorney, Agent, or Firm—Birch, Stewart, Kolasch & Birch

[57] ABSTRACT

A power supply voltage stabilizer comprising a transformer, of which the primary winding is connected to a switching means for controlling power supply to the primary winding. An oscillator circuit is associated with the switching means in order to control on/off operation of the switching means. An abnormal overvoltage and/or overcurrent detection circuit is provided for terminating the oscillation operation of the oscillator circuit when impending overvoltage and/or overcurrent is detected.

13 Claims, 7 Drawing Figures

POWER SUPPLY VOLTAGE STABILIZER

BACKGROUND AND SUMMARY OF THE INVENTION

The present invention relates to a power supply voltage stabilizer and, more particularly, to a power supply voltage stabilizer employing a switching system for controlling power supply to a transformer included in the power supply voltage stabilizer.

In the conventional power supply voltage stabilizer employing a switching system for controlling power supply to a transformer included in the power supply voltage stabilizer, there is a possibility that an abnormal overvoltage will be developed from an output terminal thereof and/or an abnormal overcurrent may flow through the primary winding of the transformer.

Accordingly, an object of the present invention is to provide a protection means for protecting the power supply voltage stabilizer from an abnormal overvoltage and/or overcurrent.

Another object of the present invention is to provide a detection means for detecting an impending overvoltage and/or overcurrent occurring within the power supply voltage stabilizer.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The power supply voltage stabilizer of the present invention mainly comprises a transformer including a primary winding connected to a commercial power source through a rectifying circuit, a secondary winding for output purposes, and an auxiliary winding. A driver circuit including a switching means is connected to the primary winding for controlling the power supply to the primary winding. An oscillator circuit is associated with the switching means to control ON-/OFF operation of the switching means, thereby controlling the power supply to the primary winding.

To achieve the above objects, pursuant to an embodiment of the present invention, an overvoltage detection circuit is connected to the auxiliary winding. The overvoltage detection circuit functions to compare a voltage created in the auxiliary winding with the rectified power supply voltage, and develop a control signal, when an impending overvoltage is detected, for terminating operation of the oscillator circuit, thereby precluding power supply to the primary winding.

In another embodiment of the present invention, an overcurrent detection circuit is provided for detecting an impending overcurrent flowing through the primary winding to develop a control signal for terminating operation of the oscillator circuit.

BRIEF DESCRIPTION OF THE DRAWINGS

The present invention will become more fully understood from the detailed description given hereinbelow and the accompanying drawings, which are given by way of illustration only, and thus are not limitative of the present invention and wherein.

DESCRIPTION OF THE PREFERRED EMBODIMENTS

Figure 1:
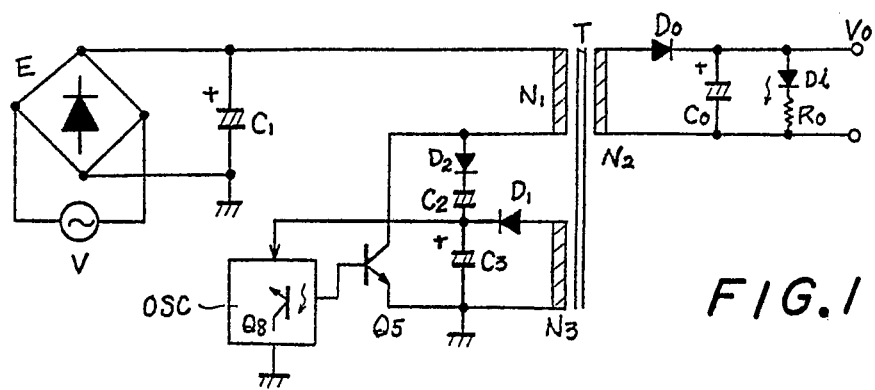
FIG. 1 is a circuit diagram of a basic construction of a power supply voltage stabilizer of the present invention.

Referring now in detail to the drawings, and to facilitate a more complete understanding of the present invention, a basic construction of a power supply voltage stabilizer of the present invention will be first described with reference to FIG. 1.

The power supply voltage stabilizer mainly comprises a transformer T including a primary winding $N_1$ connected to a commercial power source V, a secondary winding $N_2$ connected to an output terminal $V_0$, and an auxiliary winding $N_3$. An oscillator circuit OSC is associated with the primary winding $N_1$ and the auxiliary winding $N_3$ to control the power supply from the commercial power source V to the primary winding $N_1$.

A rectifying circuit E is connected to the commercial power source V for applying a rectified voltage to a capacitor $C_1$. A negative terminal of the capacitor $C_1$ is grounded, and a positive terminal of the capacitor $C_1$ is connected to the collector electrode of a switching transistor $Q_5$ through the primary winding $N_1$ of the transformer T. The oscillator circuit OSC performs the oscillating operation when receiving a predetermined voltage, and develops a control signal toward the base electrode of the switching transistor $Q_5$ to control the switching operation of the switching transistor $Q_5$. The switching transistor $Q_5$ functions to control the power supply to the primary winding $N_1$, thereby controlling the power transfer to the secondary winding $N_2$ and the auxiliary winding $N_3$.

The auxiliary winding $N_3$ is connected to a capacitor $C_3$ in a parallel fashion via a diode $D_1$. A positive terminal of the capacitor $C_3$ is connected to the oscillator circuit OSC to supply a drive voltage $V_{c3}$. A negative terminal of the capacitor $C_3$ is connected to the emitter electrode of the switching transistor $Q_5$ and grounded. The positive terminal of the capacitor $C_3$ is connected to the primary winding $N_1$ via a diode $D_2$ and a capacitor $C_2$ in order to stabilize the initial condition of the oscillator circuit OSC.

The secondary winding $N_2$ functions to develop a predetermined voltage through the output terminal $V_0$. A smoothing capacitor $C_0$ is connected to the secondary winding $N_2$ via a diode $D_0$, and a series circuit of a resistor $R_0$ and a light emitting diode $D_i$ is connected to the smoothing capacitor $C_0$ in a parallel fashion. The light emitted from the light emitting diode $D_i$ is applied to a photo transistor $Q_8$ employed in the oscillator circuit OSC. The light emitting diode $D_i$ and the photo transistor $Q_8$ are preferably incorporated in a single package as a photo coupler.

The light amount emitted from the light emitting diode $D_i$ is proportional to the output voltage developed from the output terminal $V_0$. The photo transistor $Q_8$ exhibits the impedance corresponding to the applied light amount. The oscillator circuit OSC is so constructed that the oscillation frequency is varied in response to variation of the impedance of the photo transistor $Q_8$. Accordingly, the ON/OFF operation of the switching transistor $Q_5$ is controlled in response to the output voltage level, thereby stabilizing the output voltage level.

In the above constructed power supply voltage stabilizer, there is a possibility that an abnormal overvoltage is developed through the secondary winding $N_2$ and the auxiliary winding $N_3$ when the oscillator circuit OSC or the light emitting diode $D_i$ is placed in the fault condition.

Figure 2:
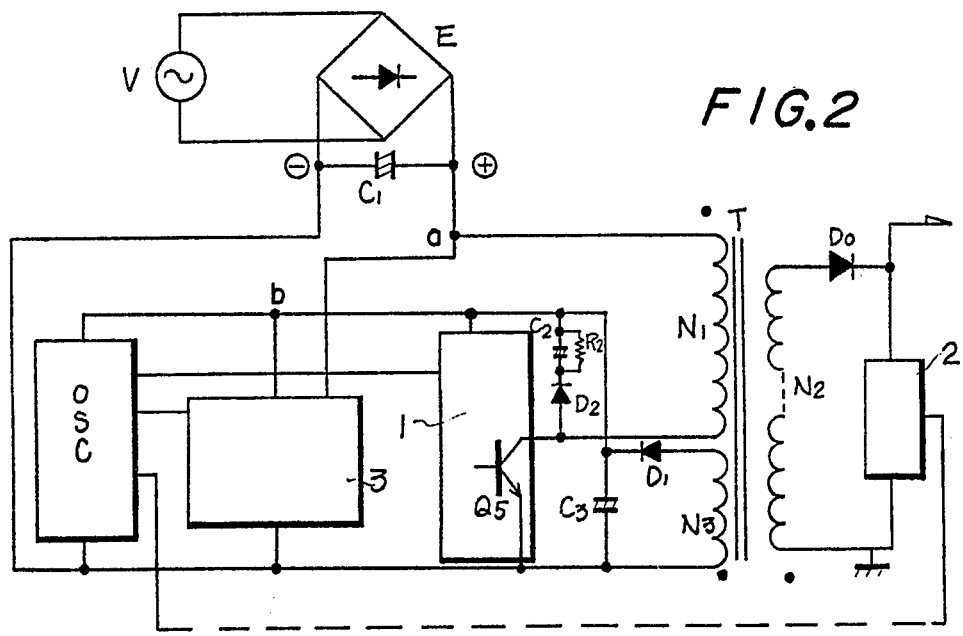
FIG. 2 is a block diagram of an embodiment of a power supply voltage stabilizer of the present invention, which includes an oscillator circuit and an over voltage detection circuit.

FIG. 2 shows an embodiment of the power supply voltage stabilizer of the present invention, which includes means for precluding occurrence of the above-mentioned overvoltage. Like elements corresponding to those of FIG. 1 are indicated by like numerals.

The power supply voltage stabilizer of FIG. 2 mainly comprises the transformer T, the oscillator circuit OSC, a driver circuit 1 including the switching transistor $Q_5$, and an overvoltage detection circuit 3.

The positive terminal of the capacitor $C_3$ is connected to the driver circuit 1 and the oscillator circuit OSC to apply the driving voltage thereto. The positive terminal of the capacitor $C_3$ is also connected to the primary winding $N_1$ through the diode $D_2$ and a parallel circuit of the capacitor $C_2$ and a resistor $R_2$ in order to stabilize the initial start operation of the oscillator circuit OSC. The secondary winding $N_2$ is connected to an output level detector 2, which comprises the light emitting diode $D_i$ as shown in FIG. 1. The ON/OFF control of the switching transistor $Q_5$ is similar to that is achieved in the power supply voltage stabilizer of FIG. 1.

The secondary winding $N_2$ and the auxiliary winding $N_3$ are wound in the same polarity fashion and, therefore, the voltage generated through the auxiliary winding $N_3$ is proportional to that voltage generated through the secondary winding $N_2$. The overvoltage detection circuit 3 is connected to receive the voltage at a point a as a power source voltage, and the voltage at a point b which is connected to the positive terminal of the capacitor $C_3$. When the voltage level at the point b exceeds a reference level, the overvoltage detection circuit 3 develops a control signal for terminating the operation of the oscillator circuit OSC.

Figure 3:
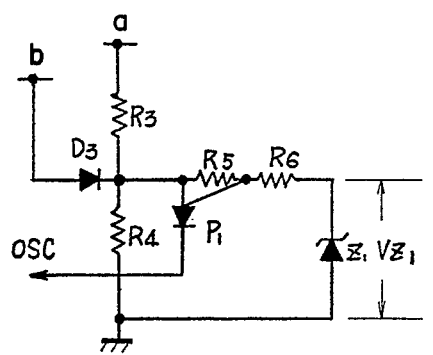
FIG. 3 is a circuit diagram of an embodiment of the overvoltage detection circuit included in the power supply voltage stabilizer of FIG. 2.

FIG. 3 shows a typical construction of the overvoltage detection circuit 3.

The voltage at the point a is applied to a series circuit of resistors $R_3$ and $R_4$, and grounded. The voltage at the point b is applied to the connection point of the resistors $R_3$ and $R_4$ via a diode $D_3$. The connection point of the resistors $R_3$ and $R_4$ is grounded through resistors $R_5$ and $R_6$ and a Zener diode $Z_1$. A double-base diode (Trade Name Programmable Unijunction Transistor) $P_1$ is provided for developing the control signal to be applied to the oscillator circuit OSC. The anode electrode of the programmable unijunction transistor $P_1$ is connected to the connection point of the resistors $R_3$ and $R_4$, the gate electrode of the programmable unijunction transistor $P_1$ is connected to the connection point of the resistors $R_5$ and $R_6$, and the cathode electrode is connected to the oscillator circuit OSC.

When the voltage level of the point b exceeds a reference level $VZ_1$, the programmable unijunction transistor $P_1$ is turned on to develop the control signal for terminating the oscillation operation of the oscillator OSC. In this way, the impending abnormal overvoltage is detected to protect the circuit elements. The ON condition of the programmable unijunction transistor $P_1$ is maintained as long as the main power switch is closed, because the overvoltage detection circuit 3 is connected to receive the voltage from the point a.

The voltage detection circuit 3 does not necessarily employ the programmable unijunction transistor. Another element showing the latching characteristics such as a negative resistance element can be employed instead of the programmable unijunction transistor.

Figure 4:
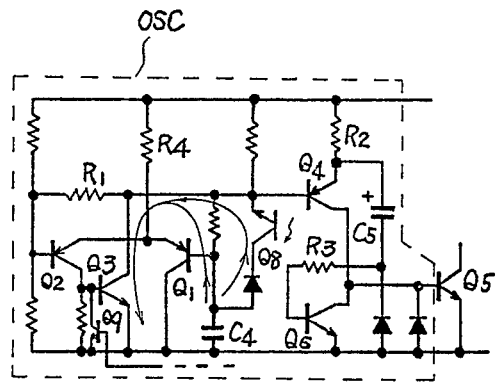
FIG. 4 is a circuit diagram of an embodiment of the oscillator circuit included in the power supply voltage stabilizer of FIG. 2.

FIG. 4 shows a typical construction of the oscillator circuit OSC.

The oscillation circuit OSC mainly comprises an astable multivibrator including transistors $Q_1$, $Q_2$ and $Q_3$, and an output stage including a transistor $Q_4$. The astable multivibrator is connected to receive the voltage appearing across the capacitor $C_3$, and develops an output signal of which frequency is determined by the circuit condition as long as the multivibrator receives a voltage greater than a predetermined level.

The output signal of the output stage is applied to the base electrode of the switching transistor $Q_5$ included in the driver circuit 1 in order to switch the switching transistor $Q_5$ with a predetermined frequency. A transistor $Q_9$ is interposed between the base electrode of the transistor $Q_3$ and the grounded terminal. The transistor $Q_9$ is controlled by the control signal derived from the overvoltage detection circuit 3. Accordingly, the transistor $Q_3$ is turned off to terminate the oscillation operation when the abnormal overvoltage is detected by the overvoltage detection circuit 3.

Figure 5:
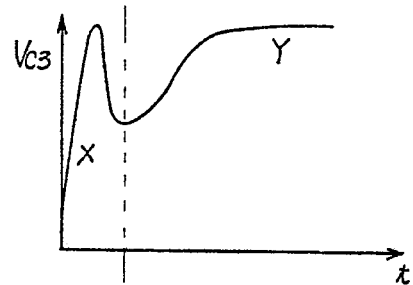
FIG. 5 is a waveform chart for explaining operation of the oscillator circuit of FIG. 4.

Now assume that a voltage $Vc_3$ is developed across the capacitor $C_3$. When main power supply switch is closed, the voltage $Vc_3$ varies in a manner shown by a curve X in FIG. 5. When the voltage $Vc_3$ reaches a predetermined level, the astable multivibrator begins the oscillation operation. More specifically, the transistor $Q_1$ is first turned on because the base electrode of the transistor $Q_1$ is connected to a capacitor $C_4$ of which the capacitance value is relatively small. At this moment, the transistor $Q_2$ is held off.

Because of turning on of the transistor $Q_1$, the capacitor $C_4$ is gradually charged through a resistor $R_4$ and the transistor $Q_1$. Accordingly, the base electrode voltage of the transistor $Q_1$ is gradually increased and, hence, the emitter electrode voltage of the transistor $Q_1$ is also increased to turn on the transistor $Q_2$. When the transistor $Q_2$ is turned on, the transistor $Q_3$ is also turned on. The base electrode voltage of the transistor $Q_2$ which is bypassed by a resistor $R_1$ is reduced and, therefore, the transistor $Q_2$ is stably on. At this moment, the transistor $Q_1$ is turned off.

When the transistor $Q_3$ is turned on, the transistor $Q_4$ is turned on to develop a signal to turn on the switching transistor $Q_5$. Upon turning on of the transistor $Q_3$, the charge stored in the capacitor $C_4$ is gradually discharged through paths shown by arrows in FIG. 4.

Therefore, the base electrode voltage of the transistor $Q_1$ is gradually reduced. When the base electrode voltage of the transistor $Q_1$ becomes less than a predetermined level, the transistor $Q_1$ is turned on, and the transistor $Q_2$, $Q_3$ and $Q_4$ are turned off. Accordingly, the transistor $Q_5$ is turned off. After passing the initial start condition, the driving voltage $V_{C3}$ is held at a predetermined level as shown by a curve Y in FIG. 5 to maintain the above-mentioned oscillation operation.

The photo transistor $Q_8$ is disposed in the discharge path of the capacitor $C_4$ in order to control the discharge period in response to the impedance of the photo transistor $Q_8$. That is, the oscillation frequency is controlled in response to the light amount emitted from the light emitting diode included in the output level detector 2.

Figure 6:
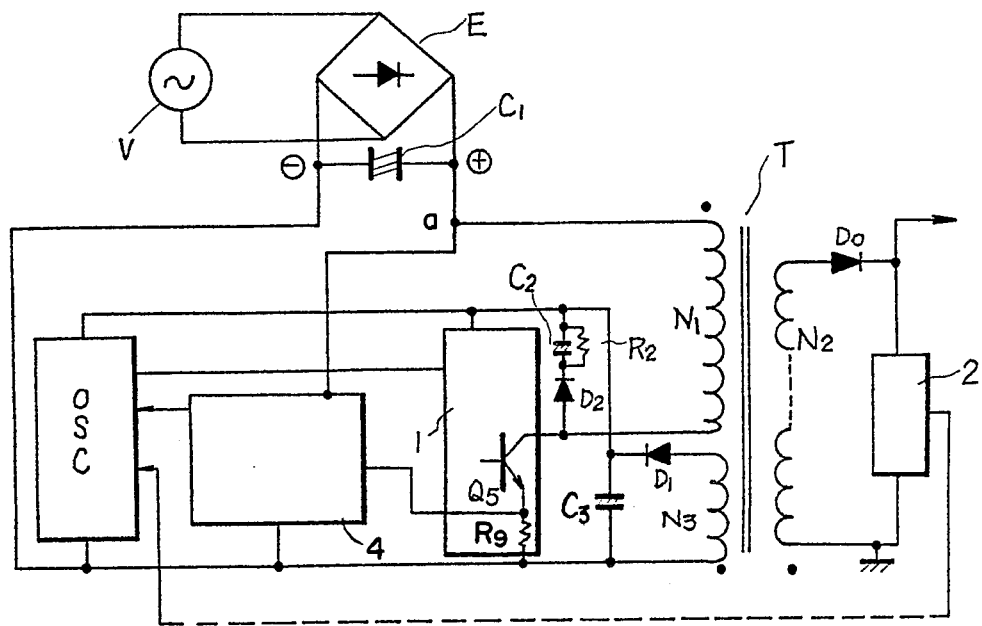
FIG. 6 is a block diagram of another embodiment of a power supply voltage stabilizer of the present invention, which includes an oscillator circuit and an overcurrent detection circuit.

FIG. 6 shows another embodiment of the power supply voltage stabilizer of the present invention, which includes means for precluding occurrence of an abnormal overcurrent. Like elements corresponding to those of FIG. 2 are indicated by like numerals.

In the power supply voltage stabilizer of FIG. 1, there is a possibility that an abnormally large current flows through the primary winding $N_1$ when the magnetic flux is saturated due to requirement of large current at the secondary winding side. The power supply voltage stabilizer of FIG. 6 includes an overcurrent detection circuit 4 for detecting an impending abnormally large current.

A resistor $R_9$ is interposed between the emitter electrode of the switching transistor $Q_5$ included in the driver circuit 1 and the grounded terminal. The overcurrent detection circuit 4 is connected to receive a signal from the connection point of the resistor $R_9$ and the emitter electrode of the switching transistor $Q_5$, thereby developing a control signal for terminating the oscillation operation of the oscillation circuit OSC.

Figure 7:
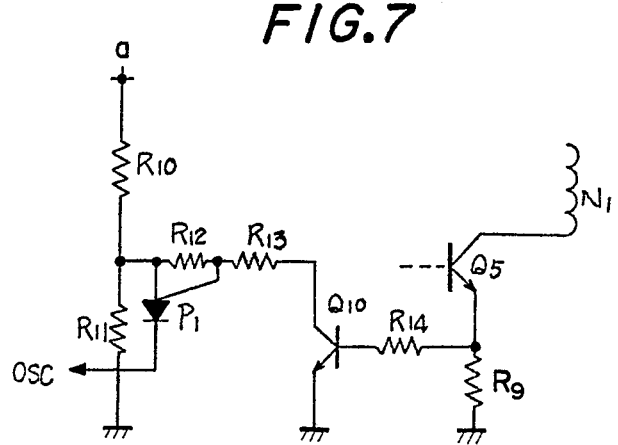
FIG. 7 is a circuit diagram of an embodiment of the overcurrent detection circuit included in the power supply voltage stabilizer of FIG. 6.

FIG. 7 shows a typical construction of the overcurrent detection circuit 4.

The voltage at the point a is applied to a series circuit of resistors $R_{10}$ and $R_{11}$, and grounded. The collector electrode of a transistor $Q_{10}$ is connected to the connection point of the resistors $R_{10}$ and $R_{11}$ through resistors $R_{12}$ and $R_{13}$. The emitter electrode of the transistor $Q_{10}$ is grounded. The base electrode of the transistor $Q_{10}$ is connected to the connection point of the resistor $R_9$ and the emitter electrode of the switching transistor $Q_5$ via a resistor $R_{14}$.

When the switching transistor $Q_5$ is turned on, a current flows through the resistor $R_9$. When the voltage drop across the resistor $R_9$ exceeds a predetermined value due to a large current, the transistor $Q_{10}$ is turned on to turn on the programmable unijunction transistor $P_1$. That is, when a large current flows through the primary winding $N_1$, the programmable unijunction transistor $P_1$ develops the control signal to terminate the oscillation operation of the oscillator circuit OSC.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A power supply voltage stabilizer comprising:
a transformer including a primary winding connected to a power source and a secondary winding for output purposes;
switching means connected to said primary winding for controlling power supply to said primary winding;
an oscillator circuit for controlling on/off operation of said switching means; and
abnormal condition detection means for developing a control signal for terminating oscillation operation of said oscillator circuit when an abnormal condition is detected;
said oscillator circuit including an astable multivibrator, and variable impedance means for varying an oscillation frequency of said astable multivibrator.

2. A power supply voltage stabilizer comprising:
a transformer including a primary winding connected to a power source and a secondary winding for output purposes;
switching means connected to said primary winding for controlling power supply to said primary winding;
an oscillator circuit for controlling on/off operation of said switching means; and
abnormal condition detection means for developing a control signal for terminating oscillation operation of said oscillator circuit when an abnormal condition is detected;
said transformer further including an auxiliary winding for developing a voltage proportional to that developed through said secondary winding, said voltage developed through said auxiliary winding being applied to said oscillator circuit for driving said oscillator circuit;
said abnormal condition detection means including an overvoltage detection circuit connected to said auxiliary winding for developing said control signal when an overvoltage is developed through said auxilliary winding;
said oscillator circuit comprising an astable multivibrator, and variable impedance means for varying an oscillation frequency of said astable multivibrator.

3. A power supply voltage stabilizer comprising:
a transformer including a primary winding connected to a power source and a secondary winding for output purposes;
switching means connected to said primary winding for controlling power supply to said primary winding;
an oscillator circuit for controlling on/off operation of said switching means; and
abnormal condition detection means for developing a control signal for terminating oscillation operation of said oscillator circuit when an abnormal condition is detected;
said transformer further including an auxiliary winding for developing a voltage proportional to that developed through said secondary winding, said voltage developed through said auxiliary winding being applied to said oscillator circuit for driving said oscillator circuit;
said abnormal condition detection means including an overvoltage detection circuit connected to said auxiliary winding for developing said control signal when an overvoltage is developed through said auxiliary winding;
said overvoltage detection circuit including a latching means for continuously developing said control signal.

4. A power supply voltage stabilizer comprising:

a transformer including a primary winding connected to a power source and a secondary winding for output purposes;

switching means connected to said primary winding for controlling power supply to said primary winding;

an oscillator circuit for controlling on/off operation of said switching means;

abnormal condition detection means for developing a control signal for terminating oscillation operation of said oscillator circuit when an abnormal condition is detected;

said transformer further including an auxiliary winding for developing a voltage proportional to that developed through said secondary winding, said voltage developed through said auxiliary winding being applied to said oscillator circuit for driving said oscillator circuit;

said abnormal condition detection means including an overvoltage detection circuit connected to said auxiliary winding for developing said control signal when an overvoltage is developed through said auxiliary winding;

said overvoltage detection circuit further includes, a reference voltage generation means for developing a reference voltage proportional to a voltage applied from said power source; and comparing means for comparing said voltage developed through said auxiliary winding with said reference voltage in order to develop said control signal when said voltage developed through said auxiliary winding exceeds said reference voltage.

5. A power supply voltage stabilizer comprising:

a transformer including a primary winding connected to a power source and a secondary winding for output purposes;

switching means connected to said primary winding for controlling power supply to said primary winding;

an oscillator circuit for controlling on/off operation of said switching means; and abnormal condition detection means for developing a control signal for terminating oscillation operation of said oscillator circuit when an abnormal condition is detected;

said abnormal condition detection means including an overcurrent detection circuit connected to said primary winding for developing said control signal when an overcurrent flows through said primary winding;

wherein said oscillator circuit includes an astable multivibrator, and variable impedance means for varying an oscillation frequency of said astable multivibrator.

6. A power supply voltage stabilizer comprising:

a transformer including a primary winding connected to a power source and a secondary winding for output purposes;

switching means connected to said primary winding for controlling power supply to said primary winding;

an oscillator circuit for controlling on/off operation of said switching means; and abnormal condition detection means for developing a control signal for terminating oscillation operation of said oscillator circuit when an abnormal condition is detected;

said abnormal condition detection means including an overcurrent detection circuit connected to said primary winding for developing said control signal when an overcurrent flows through said primary winding;

said overcurrent detection circuit including a latching means for continuously developing said control signal;

said oscillator circuit including an astable multivibrator, and variable impedance means for varying an oscillation frequency of said astable multivibrator.

7. The power supply voltage stabilizer of claim 1, 2, 5, or 6, wherein said variable impedance means comprise a photo transistor, and wherein a light emitting diode is connected to said secondary winding for emitting a light of which amount is proportional to a voltage developed through said secondary winding, said light emitted from said light emitting diode being applied to said photo transistor.

8. The power supply voltage stabilizer of claim 7, wherein said light emitting diode and said photo transistor are incorporated in a single photo coupler.

9. A power supply voltage stabilizer comprising:

a transformer including a primary winding connected to a power source and a secondary winding for output purposes;

switching means connected to said primary winding for controlling power supply to said primary winding;

an oscillator circuit for controlling on/off operation of said switching means; and abnormal condition detection means for developing a control signal for terminating oscillation operation of said oscillator circuit when an abnormal condition is detected;

said transformer further including an auxiliary winding for developing a voltage proportional to that developed through said secondary winding, said voltage developed through said auxiliary winding being applied to said oscillator circuit for driving said oscillator circuit;

said abnormal condition detection means including an overvoltage detection circuit connected to said auxiliary winding for developing said control signal when an overvoltage is developed through said auxilliary winding;

said overvoltage detection circuit including a latching means for continuously developing said control signal;

said oscillator circuit including an astable multivibrator, and variable impedance means for varying an oscillation frequency of said astable multivibrator.

10. A power supply voltage stabilizer comprising:

a transformer including a primary winding connected to a power source and a secondary winding for output purposes;

switching means connected to said primary winding for controlling power supply to said primary winding;

an oscillator circuit for controlling on/off operation of said switching means;

abnormal condition detection means for developing a control signal for terminating oscillation operation of said oscillator circuit when an abnormal condition is detected;

said transformer further including an auxiliary winding for developing a voltage proportional to that developed through said secondary winding, said voltage developed through said auxiliary winding being applied to said oscillator circuit for driving said oscillator circuit;

said abnormal condition detection means including an overvoltage detection circuit connected to said auxiliary winding for developing said control signal when an overvoltage is developed through said auxiliary winding;

said overvoltage detection circuit including,
 a reference voltage generation means for developing a reference voltage proportional to a voltage applied from said power source; and
 comparing means for comparing said voltage developed through said auxiliary winding with said reference voltage in order to develop said control signal when said voltage developed through said auxiliary winding exceeds said reference voltage;
 said oscillator circuit including an astable multivibrator, and a variable impedance means for varying an oscillation frequency of said astable multivibrator.

11. A power supply voltage stabilizer comprising:
transformer means including a primary winding connected to a power source, a secondary winding for producing an output voltage, and an auxiliary winding for developing a voltage proportional to said output voltage produced by said secondary winding;
switching means connected to said primary winding for controlling the power supply from said power source to said primary winding;
oscillator circuit means for controlling the on/off operation of said switching means;
overvoltage detection circuit means connected to said auxiliary winding for developing a control signal to terminate the oscillation operation of said oscillator circuit means when an overvoltage condition is detected, said overvoltage detection circuit means including,
 means for developing a reference potential, and
 comparing means responsive to said voltage developed at said auxiliary winding and to said reference potential for comparing said reference potential with said voltage developed at said auxiliary winding and for generating said control signal to terminate the oscillation operation of said oscillator circuit means when said voltage developed at said auxiliary winding exceeds said reference potential.

12. A power supply voltage stabilizer comprising:
transformer means including a primary winding connected to a power source and having a voltage supplied thereto, a secondary winding for producing an output voltage, and an auxiliary winding for developing a voltage proportional to said output voltage produced by said secondary winding;
switching means connected to said primary winding for controlling the power supply from said power source to said primary winding;
oscillator circuit means for controlling the on/off operation of said switching means;
overcurrent detection circuit means connected to said primary winding for developing a control signal to terminate the oscillation operation of said oscillator circuit means when an overcurrent condition is detected, said overcurrent detection circuit means including,
 means for monitoring said voltage supplied to said primary winding of said transformer means,
 means for measuring the amount of current passing through said primary winding of said transformer means by translating said amount of current into a corresponding amount of voltage potential,
 switching means responsive to said corresponding amount of voltage potential for switching to a first switched condition when the corresponding voltage potential exceeds a predetermined voltage potential and for switching to a second switched condition when said voltage potential does not exceed said predetermined voltage potential, and
 comparing means responsive to said voltage supplied to said primary winding and connected to an output of said switching means for generating said control signal to terminate oscillation operation of said oscillator circuit means when said switching means switches to said first switched condition in response to the exceeding of said predetermined voltage potential by said corresponding voltage potential.

13. A power supply voltage stabilizer in accordance with claim 11 or 12 wherein said comparing means comprises a double base diode.

* * * * *